United States Patent Office 2,924,608
Patented Feb. 9, 1960

2,924,608

ETHYLENE CARBONATES

William Mills, Pasadena, Tex., assignor to Olin Mathieson Chemical Corporation, a corporation of Virginia No Drawing. Application December 30, 1957
Serial No. 705,732

2 Claims. (Cl. 260—340.2)

This invention relates to the manufacture of alkylene carbonates from alkylene oxides and carbon dioxide. More particularly, it relates to the use of an improved catalyst in the reaction.

The reaction of carbon dioxide with alkylene oxides to produce the corresponding alkylene carbonates does not give significant amounts of product in the absence of a catalyst. The use of activated carbon has been proposed as a catalyst. For example, German Patent 740,366 describes yields as high as 90 percent of ethylene carbonate employing alkali treated activated carbon as catalyst for the reaction of carbon dioxide and ethylene oxide.

More recently, Cline, in U.S. Patent 2,667,497, issued January 26, 1954, has described the use of certain alkaline earth metal halides as catalysts for the reaction. In the continuous operation of the process of Cline over protracted periods, however, the solid catalyst undergoes physical and, apparently, chemical changes, particularly when the catalyst is calcium chloride. It appears to dissolve and/or react, giving rise to a gelatinous precipitate. The latter tends to clog lines, valves and pumps and eventually the reaction mixture sets up completely and stops operation.

It has now been found that, when a continuous process for the carbonate synthesis is initiated in the presence of a fresh catalytic solution of from 3% to 10% calcium or magnesium chloride, bromide or iodide dissolved in an alkylene carbonate and the catalytic solution constitutes from 10% to 30% by weight of the alkylene carbonate-carbon dioxide reaction mixture, the formation of the gelatinous precipitate is avoided.

In continuous operation, the fresh catalytic solution is pumped continuously to the reactor with fresh carbon dioxide and alkylene oxide, preferably in an amount such that the catalytic solution constitutes 20.0 to 25.0 percent by weight of the reaction mixture. The reaction mixture, after a suitable holding time, is discharged and fractionated. It may, for example, be discharged first to a flash drum which unreacted carbon dioxide and alkylene oxide are recovered, repressured and recycled. The residue is fractionated to recover the alkylene carbonate formed as well as that charged in the catalyst solution. The residue from the fractionation contains the metal halide catalyst and/or its reaction products, if any, and by-product polymeric alkylene oxides. It may be worked up for the latter if desired.

In this continuous operation, the difficulty of formation of gelatinous precipitates is entirely avoided. Even when the holding time under the reaction conditions of elevated temperature and pressure is as much as an hour or more, no such gelatinous precipitates are formed. Moreover, the alkaline earth metal halide is not held continuously under such conditions until it reacts to form insoluble materials, but is subjected to the reaction conditions only during the holding time. While the unreacted carbon dioxide and alkylene oxide are recovered overhead and recycled, the catalyst is preferably used only on a once-through basis. In this way, the problem usually encountered in operating continuously is avoided.

*Example 1*

In a continuous process, 3 pounds per hour of carbon dioxide, 2.25 pounds per hour of ethylene oxide, and 0.06 pound per hour of anhydrous calcium chloride dissolved in 1.2 pounds per hour of ethylene carbonate are maintained at a pressure of 800 p.s.i.g. and a temperature of 375° F. in a steel tubular coil reactor. The holding time is approximately one hour. The product passes through a cooler and into a flash drum. The residue is vacuum distilled to produce 3.1 pounds per hour of new ethylene carbonate which is a yield of 68.4 percent based on the ethylene oxide charged.

What is claimed is:

1. In the continuous production of lower alkylene carbonate by reaction of a mixture of carbon dioxide and lower alkylene oxide under elevated temperature and pressure and recovery of the lower alkylene carbonate from the reaction mixture, the method which comprises introducing carbon dioxide, lower alkylene oxide and a fresh catalytic solution into a reaction zone whereby the reaction of the mixture of carbon dioxide and lower alkylene oxide is initiated in the presence of the fresh catalytic solution and discharging the contents of the reaction zone from the reaction zone before gelatinous precipitate is formed, said fresh catalytic solution consisting essentially of from 3% to 10% by weight of a halide selected from the group consisting of chlorides, bromides and iodides of an alkaline earth metal selected from the group consisting of calcium and magnesium dissolved in a lower alkylene carbonate, said fresh catalytic solution comprising from 10% to 30% by weight of said reaction mixture.

2. The process of claim 1 in which the alkylene oxide is ethylene oxide, the halide is calcium chloride and the alkylene carbonate is ethylene carbonate.

References Cited in the file of this patent

UNITED STATES PATENTS 2,667,497  Cline _____ Jan. 26, 1954